UNITED STATES PATENT OFFICE.

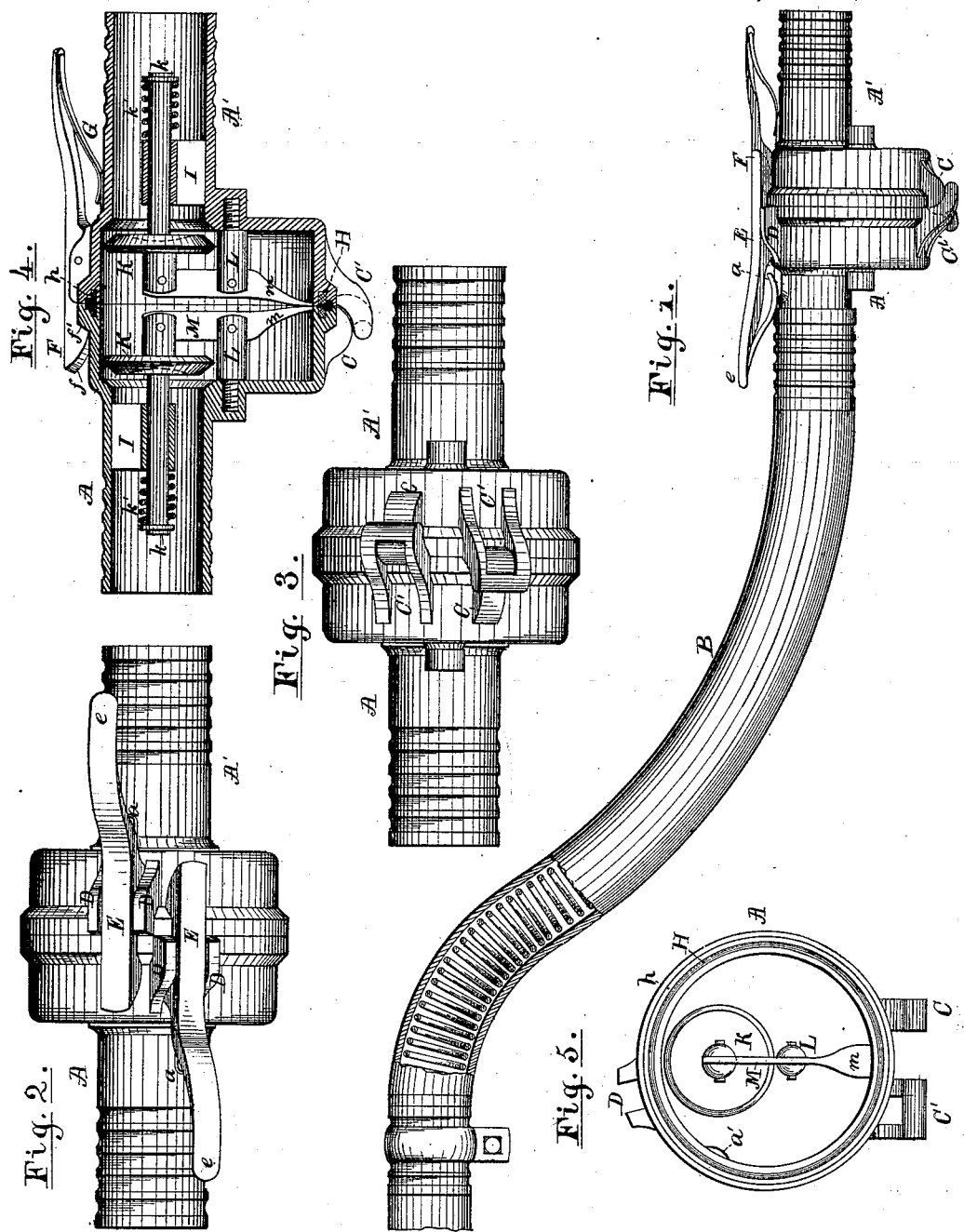

FREDERICK W. EAMES, OF WATERTOWN, NEW YORK.

IMPROVEMENT IN CAR-BRAKE COUPLINGS.

Specification forming part of Letters Patent No. 200,031, dated February 5, 1878; application filed June 12, 1877.

*To all whom it may concern:*

Be it known that I, FREDERICK W. EAMES, of Watertown, in the county of Jefferson and State of New York, have invented certain new and useful Improvements in Couplings for Car-Brakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to railroad-braking apparatus; and consists in a new and improved device for coupling the tubes or pipes between the cars, said coupling being adapted for use in connection with either compressed air, water, gas, or atmospheric pressure as opposed to a vacuum, the invention consisting in certain new and improved devices and combinations of devices embodied in the construction of the coupling, whereby a close union of the parts is insured under all ordinary contingencies, and whereby, in case of accident or the separation of the cars, the coupling devices will separate without injury to the parts of the coupling, and automatically close the openings or ports in their ends, so as to prevent the passage of air, &c., through them.

In the accompanying drawings, Figure 1 is an elevation of the coupling shown attached to the hose or tube which forms the connection between the cars of a train. Fig. 2 is a top-plan view of the coupling. Fig. 3 is a bottom view of the same. Fig. 4 is a sectional view, showing the interior, the valves being shown in elevation. Fig. 5 is an end view of one of the halves of the coupling.

Referring to the parts by letters, A A' represent the two halves or parts of the coupling. They are counterparts of each other, being constructed in all respects alike, so that either part may be a right half or left half, according as it is attached to either end of the car; and they are so attached to the ends of the cars, or the tubes connected with the ends of the cars, that when two cars come together one will always present the right half of the coupling and the other the left half, or vice versa, in proper position to effect the coupling.

B represents the hose or tubes which form the connection between the cars. Each half of the coupling is provided with lugs on its lower side, one, C, being formed in the shape of a hook, and the other, C', in the form of a staple.

D D are lugs formed on the upper side of each half of the coupling, between which a lever, E, is pivoted. One end of this lever is formed into a handle or thumb-piece, e, and its other end is formed into a hook, F, having a rounded face, f, and an oblique-angled shoulder, f'.

G is a spring, one end of which is secured to the handle e, while the other or free end rests upon a flat-faced projection, a, formed on the upper portion of the coupling. h is an annular groove formed in the rim or face of the coupling, the outer portion being enlarged, as shown by Fig. 4 of the drawings.

H is a rubber gasket or packing-ring, which is inserted in and fits the narrow and deeper portion of this annular groove h. The groove is widened, so that when the two parts of the coupling are brought together, and the rubber gaskets are compressed against each other, they will have room to expand within the space left by the widening of the groove.

a' is a lug on the inner periphery of each half-coupling, serving as a guide, and aiding in holding the parts in proper position when brought together.

I is a bracket on the inside or tube portion of the coupling, and which is secured to or forms part of the same. It is provided with a sleeve or guide for the stem of the valve which passes through it.

K is the valve, and k is the valve-stem. k' is a spiral spring coiled around the inner portion of the valve-stem, one end bearing against a washer or disk secured to the inner end of the valve-stem, and the other against the bracket I. The outer end of the valve-stem projects beyond the valve, and is forked or slotted.

L is a slotted or forked bracket or projection secured within the enlarged portion of the coupling beneath the valve. M is a lever, the upper end of which is pivoted to and between the forks of the projecting end of the valve-stem. It is also pivoted to and between the forked end of the bracket L, the pin of the latter pivot forming the fulcrum. The lower or free end of the lever m is curved outwardly and downwardly, as clearly shown by Fig. 4 of the drawing.

The operation is as follows: When the coupling of the pipes or tubes between the cars is to be effected, the operator takes hold of the parts, one in each hand, his thumbs resting on the ends e of the levers E. He then inserts the hook-formed lugs C into the staple-formed lugs C' and, pressing upon the handles of the levers E, forces the two parts of the coupling together, the hooks F catching onto the flanges or rims of the coupling, as clearly shown by Figs. 1 and 4 of the drawings. As the parts of the coupling are thus forced together, the ends m of the levers M are forced against each other, and the levers, turning on their pivots, open the valves K, and keep them open so long as the coupling is effected, thereby permitting of the free passage of the compressed air, steam, or other fluid through the pipes.

Should, however, any accident occur to sever the connection between the parts of the coupling, they will come apart without injury, and the valves will close automatically through the action of the springs k', and thereby prevent the passage of the air, &c., into or from the pipes.

It will be seen that the oblique form of the shoulder f' of the hook F allows it to slip over the correspondingly-shaped flange or rim of the coupling; and as soon as the hooks are thus disengaged the hook-lugs C will become detached from the staple-lugs C', and thus no part of the coupling is destroyed in case of a forcible or accidental separation of the parts.

When it is desired to detach the parts by hand, all that is necessary is to press upon the lever-handles e until the hooks become detached. Then the two halves of the coupling may be pulled apart, the valves K closing automatically as soon as the separation is effected.

Having thus described my invention, what I claim as new, and desire to secure by Letters Patent, is—

1. The herein-described coupling, consisting of the two parts A A', each the counterpart of the other, and having the hooked lugs C and staple-lugs C', substantially as and for the purpose specified.

2. In a coupling device consisting of two parts, each the counterpart of the other, the combination of the hooked levers E and springs G with the hook-formed lugs C and staple-formed lugs C', substantially as and for the purpose specified.

3. In a coupling device consisting of two parts, substantially as described, the combination of the valves K, brackets L, and levers M, arranged to operate substantially as and for the purpose specified.

4. In a coupling device, substantially as described, the combination of the valve K, valve-stem k, sleeve-guideway I, and spiral spring k', operating to close the valve automatically, as set forth.

In testimony that I claim the foregoing as my own I affix my signature in presence of two witnesses.

FREDERICK W. EAMES.

Witnesses:
D. G. STUART,
A. McCALLUM.